(12) United States Patent
Boucadair et al.

(10) Patent No.: US 11,575,575 B2
(45) Date of Patent: Feb. 7, 2023

(54) CONFIGURATION METHOD FOR IMPLEMENTATION IN A NETWORK USING A DYNAMIC ROUTING PROTOCOL

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/767,419

(22) PCT Filed: Nov. 21, 2018

(86) PCT No.: PCT/FR2018/052933
§ 371 (c)(1),
(2) Date: May 27, 2020

(87) PCT Pub. No.: WO2019/106259
PCT Pub. Date: Jun. 6, 2019

(65) Prior Publication Data
US 2020/0389360 A1 Dec. 10, 2020

(30) Foreign Application Priority Data
Nov. 28, 2017 (FR) ...................................... 1761305

(51) Int. Cl.
*H04L 41/08* (2022.01)
*H04L 45/02* (2022.01)
(Continued)

(52) U.S. Cl.
CPC .......... *H04L 41/0886* (2013.01); *H04L 45/02* (2013.01); *H04L 45/04* (2013.01); *H04L 67/141* (2013.01); *H04L 69/325* (2013.01)

(58) Field of Classification Search
CPC .................................................. H04L 41/0886
See application file for complete search history.

(56) References Cited

U.S. PATENT DOCUMENTS

2014/0181292 A1   6/2014  Venkataswami et al.
2015/0229512 A1*  8/2015  Dutti ..................... H04L 43/065
                                                             709/221
(Continued)

OTHER PUBLICATIONS

International Search Report dated Jan. 14, 2019 for corresponding International Application No. PCT/FR2018/052933, filed Nov. 21, 2018.

(Continued)

*Primary Examiner* — Adnan M Mirza
(74) *Attorney, Agent, or Firm* — David D. Brush; Westman, Champlin & Koehler, P.A.

(57) ABSTRACT

A configuration method includes: receiving, by a first device of a network, a first control message having configuration elements for activating a dynamic routing protocol in the network; configuring by the first device setup parameters for establishing sessions according to the protocol used by the first device on the basis of configuration elements included in the first message; if the configuration elements in the message include a management instruction for handling sessions according to the protocol in the network, executing by the first device the at least one management instruction; and if the configuration elements in the message include a setting for directing propagation of the configuration elements in the network, dispatching by the first device in accordance with the propagation setting at least one second control message to at least one second device of the network, which includes all or some of the configuration elements.

13 Claims, 4 Drawing Sheets

(51) Int. Cl.
 *H04L 67/141* (2022.01)
 *H04L 69/325* (2022.01)

(56) References Cited

U.S. PATENT DOCUMENTS

2016/0294612 A1    10/2016  Ravinoothala et al.
2017/0163532 A1     6/2017  Tubaltsev et al.
2020/0274797 A1*    8/2020  Ravinoothala .......... H04L 45/64

OTHER PUBLICATIONS

Written Opinion of the International Searching Authority dated Jan. 14, 2019 for corresponding International Application No. PCT/FR2018/052933, filed Nov. 21, 2018.
English translation of the Written Opinion of the International Searching Authority dated Jan. 23, 2019 for corresponding International Application No. PCT/FR2018/052933, filed Nov. 21, 2018.
EPO Communication pursuant to Article 94(3) EPC corresponding to European Patent Application No. 18 822 426.5, dated Jan. 28, 2022. [Translated into English via Google translate].
Lindem Cisco Systems K Patel Arrcus A et al., "BGP Logical Link Discovery Protocol (LLDP) Peer Discovery; draft-acee-idr-ildp-peer-discovery-01.txt"; IETF; Standardworkingdraft, Internet Society (ISOC) 4, Rue Des Falaises CH-, No. 1, Jul. 3, 2017, pp. 1-16.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|    Version    |
+-+-+-+-+-+-+-+-+-+-+-+-+-+-+-+-+
|    My Autonomous System       |
+-+-+-+-+-+-+-+-+-+-+-+-+-+-+-+-+
|         Hold Time             |
+-+-+-+-+-+-+-+-+-+-+-+-+-+-+-+-+-+-+-+-+-+-+-+-+-+-+-+-+-+-+-+-+
|                       BGP Identifier                          |
+-+-+-+-+-+-+-+-+-+-+-+-+-+-+-+-+-+-+-+-+-+-+-+-+-+-+-+-+-+-+-+-+
| Opt Parm Len  |
+-+-+-+-+-+-+-+-+-+-+-+-+-+-+-+-+-+-+-+-+-+-+-+-+-+-+-+-+-+-+-+-+
|                                                               |
|             Optional Parameters (variable)                    |
|                                                               |
+-+-+-+-+-+-+-+-+-+-+-+-+-+-+-+-+-+-+-+-+-+-+-+-+-+-+-+-+-+-+-+-+
```

FIG.5A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+
|    Version    |
+-+-+-+-+-+-+-+-+-+-+-+-+-+-+-+-+
|    My Autonomous System       |
+-+-+-+-+-+-+-+-+-+-+-+-+-+-+-+-+
|         Hold Time             |
+-+-+-+-+-+-+-+-+-+-+-+-+-+-+-+-+-+-+-+-+-+-+-+-+-+-+-+-+-+-+-+-+
|                       BGP Identifier                          |
+-+-+-+-+-+-+-+-+-+-+-+-+-+-+-+-+-+-+-+-+-+-+-+-+-+-+-+-+-+-+-+-+
| Opt Parm Len  |
+-+-+-+-+-+-+-+-+-+-+-+-+-+-+-+-+-+-+-+-+-+-+-+-+-+-+-+-+-+-+-+-+
|                                                               |
|             BGP_PEER_POLICY (variable)                        |
|                                                               |
+-+-+-+-+-+-+-+-+-+-+-+-+-+-+-+-+-+-+-+-+-+-+-+-+-+-+-+-+-+-+-+-+
|                                                               |
|             Optional Parameters (variable)                    |
|                                                               |
+-+-+-+-+-+-+-+-+-+-+-+-+-+-+-+-+-+-+-+-+-+-+-+-+-+-+-+-+-+-+-+-+
```

FIG.5B

```
 0                   1
 0 1 2 3 4 5 6 7 8 9 0 1 2 3 4 5
+-+-+-+-+-+-+-+-+-+-+-+-+-+-+-+-+-+-+-+-...
| BPP. Type     | BPP. Length | Subtype | BPP Value (variable)
+-+-+-+-+-+-+-+-+-+-+-+-+-+-+-+-+-+-+-+-...
```

FIG.5C

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |           Reserved            |
+-+-+-+-+-+-+-+-+-+-+-+-+-+-+-+-+-+-+-+-+-+-+-+-+-+-+-+-+-+-+-+-+
|                            Lifetime                           |
+-+-+-+-+-+-+-+-+-+-+-+-+-+-+-+-+-+-+-+-+-+-+-+-+-+-+-+-+-+-+-+-+
|                                                               |
:                        BGP_PEER_POLICY                        :
|                                                               |
+-+-+-+-+-+-+-+-+-+-+-+-+-+-+-+-+-+-+-+-+-+-+-+-+-+-+-+-+-+-+-+-+
```
FIG.6
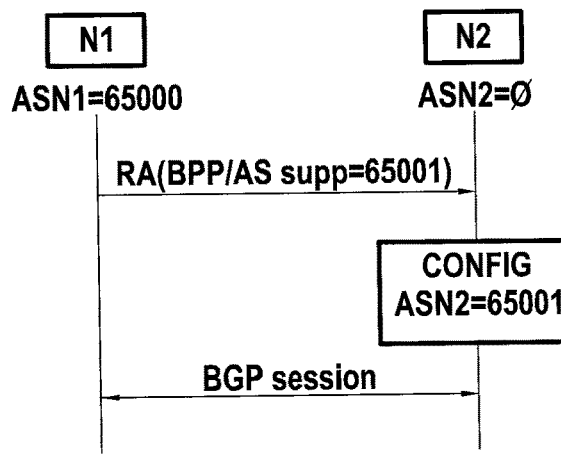
FIG.7
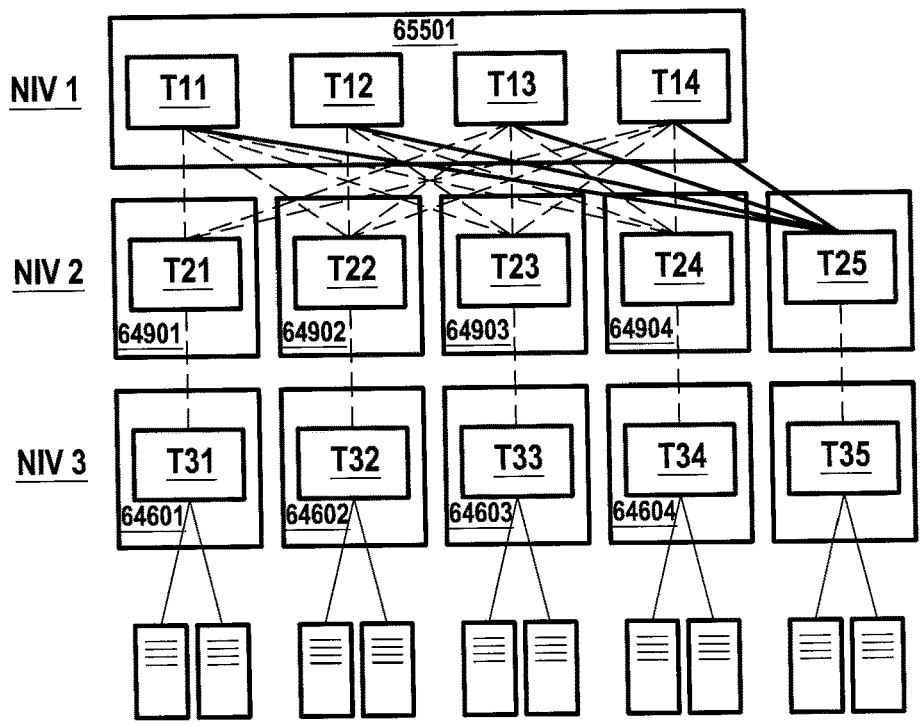
FIG.8

CONFIGURATION METHOD FOR IMPLEMENTATION IN A NETWORK USING A DYNAMIC ROUTING PROTOCOL

CROSS-REFERENCE TO RELATED APPLICATIONS

This Application is a Section 371 National Stage Application of International Application No. PCT/FR2018/052933, filed Nov. 21, 2018, which is incorporated by reference in its entirety and published as WO 2019/106259 A1 on Jun. 6, 2019, not in English.

BACKGROUND OF THE INVENTION

The invention relates to the general field of telecommunications.

It relates more particularly to the configuration of devices of a telecommunications network implementing a dynamic routing protocol, such as the BGP (Border Gateway Protocol), OSPF (Open Shortest Path First) or even IS-IS (Intermediate System to Intermediate System) protocol, for the calculation, the selection and the establishment of routes intended to carry the traffic through the network.

Such routing protocols are commonly used in the telecommunications networks to communicate routing information between different autonomous systems (or AS). Typically, the Internet network currently consists of several tens of thousands of autonomous systems, each being operated by a specific administrative entity, called network operator or administrator. Each autonomous system is identified by a globally unique number called autonomous system number or AS number (or ASN for AS Number).

The BGP protocol is increasingly used today in the network infrastructures (also more simply referred to as "networks" hereinafter) on which the data centers (or DC) are based, and in particular the large data centers, also known as MSDC (Massively Scalable Data Centers) or HSDC (Hyper-Scale Data Centers). The BGP protocol allows within these network infrastructures to exchange routing information between the different pieces of equipment of the network (e.g. routers, controllers or switches). The network infrastructure of a data center can constitute a full-fledged autonomous system or be organized according to a set of autonomous systems that can for example form a "BGP confederation" when the infrastructure is massively distributed. Within such a network infrastructure, private AS numbers, i.e., numbers not visible in the Internet, are often used to facilitate the management of the BGP routing policy without having to require the assignment of a globally unique AS number. This makes it easier to distinguish the network infrastructure of the data center per se from the network to which this infrastructure is connected and to which a separate AS number is assigned. Within the network infrastructure of the data center, the same AS number can for example be used by several routers located on the same hierarchical level. Also, BGP extensions specific to the data centers (e.g. "allowas-in") have been developed by some manufacturers to be able to use the same AS number in different hierarchical levels.

The deployment of a data center requires a high level of automation of the resource production processes (e.g. dynamic production of virtual machines intended to host some virtualized network functions), in order to simplify the procedures for configuring the equipment of the network infrastructure of the data center and minimize the risks of errors. Such automation further allows improving the availability and stability of the network: any modification of the topology of the network infrastructure related to the introduction of new switching (e.g. switches, routers) or transmission (e.g. intra- and inter-center data links intended to provide more capacity to handle more traffic) resources must be done in a dynamic manner requiring minimal configuration effort or no configuration effort at all.

In addition, it is important to control the volumetry of the signaling traffic consisting in particular of configuration information emitted within the network infrastructure, typically by one or more network controllers when the data center is based on Software-Defined Networking (SDN) type architecture, for example. This signaling traffic can also comprise notifications emitted by some equipment of the network when they detect a modification in its topology, for example the breaking of a connection between two switches located within the same data center. It is imperative to make sure that the volumetry of the signaling traffic exchanged does not in any way penalize the availability of the service(s) that would involve resources hosted within the infrastructure of the data center.

In order to optimize the exploitation of the resources within a data center, the configuration of the equipment of the underlying network must comply with adequate procedures for the nomenclature of the interfaces, the addresses allocated to these interfaces, etc. Particularly, the implementation of a routing policy within the network infrastructure of the data center according to a routing protocol such as BGP is based on the establishment of BGP sessions between the different pieces of equipment of the network. These sessions are established on the basis of different configuration information such as the AS number to which each piece of equipment belongs: the AS number is mandatory information in order to establish a BGP session between two routers. Indeed, if a BGP router does not know the number of the autonomous system to which it belongs, it is unable to establish a BGP session with another router belonging to a neighbor autonomous system, but also with the other routers of the autonomous system to which it belongs. The establishment of BGP sessions between all the equipment of an autonomous system is imperative to guarantee a global and coherent vision of the topology of the network infrastructure, and the AS number conditions the establishment of such sessions. Note also that this AS number is also used to select the BGP routes and for the detection and the prevention of routing loops within the network infrastructure.

In the current state of the art, the process of configuring the characteristic functions of the activation of a dynamic routing protocol such as BGP within a network infrastructure (of a data center, or of any other network infrastructure), requires the explicit configuration of each piece of equipment of the network by the operator of the network. This configuration is made via the programming by the operator of the network of a plurality of elementary tasks; these elementary tasks consist in that the administrator of the network connects to each piece of equipment of the network in order to configure all the parameters that each piece of equipment needs for the establishment of BGP sessions with its peers. Such a configuration procedure is complex and therefore requires human, often time-consuming, intervention with high risks of errors which can prove to be harmful (for example, by penalizing access to the data center or to an equipment subset of the center). Particularly, the BGP peers must have their own AS number, the AS numbers of their neighbors, the IP address(es) of their neighbors, and an explicit instruction to activate the BGP protocol.

There is therefore a need for a process of automatically configuring the equipment of a network so that the latter can activate a dynamic routing protocol such as BGP. Such a process would not only significantly reduce the time spent on the configuration of the equipment, but also substantially limit the risks of errors to which complex configuration procedures are often exposed.

OBJECT AND SUMMARY OF THE INVENTION

The invention meets in particular this need by proposing a configuration method for implementation in a network comprising a plurality of devices and using a dynamic routing protocol, this configuration method comprising:
- a step of receiving, by a first device of the network, a first control message comprising configuration elements for the activation of the dynamic routing protocol in the network;
- a step of configuring, by the first device, session establishment parameters according to said protocol used by the first device from configuration elements comprised in the first message;
- if the configuration elements comprised in the first message further comprise at least one session management instruction according to said protocol in the network, a step of executing, by the first device, said at least one management instruction; and
- if the configuration elements comprised in the first message comprise a setpoint for the propagation of the configuration elements in the network, a step of sending, by the first device in accordance with said propagation setpoint, at least one second control message to at least one second device of the network, this second control message comprising all or part of the configuration elements comprised in the first message.

Correlatively, the invention also relates to a device of a network comprising a plurality of devices and using a dynamic routing protocol, this device, called first device, comprising:
- a receiving module able to receive a first control message comprising configuration elements for the activation of the dynamic routing protocol in the network;
- a configuration module adapted to configure session establishment parameters according to said protocol used by the first device from configuration elements comprised in the first message;
- an execution module configured, if the configuration elements comprised in the first message comprise at least one session management instruction according to said protocol in the network, to execute said at least one management instruction; and
- a propagation module, activated if the configuration elements comprised in the first message comprise a setpoint for the propagation of the configuration elements in the network, said propagation module being configured to send at least one second control message to at least one second device of the network in accordance with said propagation setpoint, this second control message comprising all or part of the configuration elements comprised in the first message.

In other words, the invention proposes an automatic configuration mechanism allowing the activation of the dynamic routing protocol within the network, and distributed over all the devices of the network. The first device receives, via a control message, configuration elements it extracts and executes, then transmits, based on the instructions conveyed in the control message it has received, configuration elements to at least one second device of the network, these configuration elements being intended to be applied and/or used by said second device to enable the activation of the dynamic routing protocol. More specifically, each second device receiving a control message from the first device applies the command included in the message, i.e., extracts from the control message the configuration elements relating thereto, is configured these, then transmits in turn, when appropriate, in a control message, configuration elements to one or more other devices of the network in accordance with the propagation setpoints included in the control message it has received, etc.

It is noted that according to the invention, the configuration elements comprised in the control message can be of different natures. They can in particular comprise session establishment parameters according to the routing protocol (such as for example an AS number, or one or more timer values to be applied during sessions according to the dynamic routing protocol), but also instructions to manage sessions according to the dynamic routing protocol (such as setpoints for the establishment of sessions with all or part of the devices of the network or for the allocation of AS numbers), as well as setpoints for the propagation of the configuration elements in the network. More generally, these elements can comprise any type of information that allows configuring the devices of the network to activate the dynamic routing protocol in the network, i.e. to make its use in the network operational and in particular allow the establishment of sessions or adjacencies (within the meaning of the OSPF protocol) according to this protocol between the devices of the network.

A same configuration element may also carry several types of configuration information, such as for example a session establishment parameter and implicitly a session management instruction according to the dynamic routing protocol (for example establishing a session according to the dynamic routing protocol with all the direct neighbors) and an implicit information of propagation of the configuration elements in the network induced by this management instruction (for example, propagating the configuration elements towards all the neighbors with which a session is established), etc.

Thus, according to the invention, the devices of the network gradually propagate the required configuration elements (parameters for the establishment of sessions according to the routing protocol and when appropriate, instructions for the management of the sessions according to this protocol and setpoints for the propagation of the configuration elements) for the activation of the dynamic routing protocol. The way in which the propagation must be orchestrated within the network according to the routing policy chosen is advantageously transmitted in the messages exchanged between the different devices.

Thanks to the invention, a high level of automation of the procedure for configuring the network devices for the activation of the dynamic routing protocol in the network, is reached. This level of automation satisfies in a privileged, but not limiting manner, the requirements of the large data centers such as the MSDC or HSDC data centers, and allows a simplification of the operations within the underlying network infrastructures. This automation also makes it possible to minimize the risks of error to which configuration procedures executed by an administrator of the network are typically exposed.

The invention further allows limiting the interactions between the various devices of the network for the activation of the routing protocol, and, consequently, reducing the volumetry of the signaling traffic resulting therefrom. Indeed, thanks to the gradual propagation of the configuration elements, it is possibly sufficient for the operator of the network to explicitly configure a single piece of equipment of the network, which then transmits the parameters required for the establishment of sessions according to the routing protocol to its neighbors, as well as the routing policy desired by the operator of the network. These neighbors then relayed the information to their own neighbors, etc. The procedure for configuring network devices is thus greatly simplified, and coherent between all the devices of the network. It allows limiting the risks of errors related to a manual configuration of all the devices. It further allows reducing the operating costs related to the configuration of the network.

Furthermore, the automatic configuration proposed by the invention offers great flexibility in terms of routing policies. It can adapt to different types of networks, to different topologies of these networks (e.g. organization in clusters, hierarchical levels) and to different configurations of these networks (e.g. use of private AS numbers, or allocation of separate AS numbers at hierarchical levels or separate clusters).

In a particular embodiment, the execution step further comprises a step of establishing at least one session according to said routing protocol with said at least one second device.

In this way, at the end of the configuration of the different devices of the network, all sessions according to the routing protocol corresponding to the desired routing policy are established automatically, and the routing protocol is activated and can be used to carry the traffic within the network.

In a particular embodiment, said at least one second message is a session establishment message according to said routing protocol.

In this way, a session between the first device and the second device is established at the same time as the transmission of the configuration elements to the second device. In the case of the BGP protocol, the second message is for example a BGP message OPEN, modified so as to include the configuration elements necessary for the activation of the BGP routing protocol. In other words, the BGP message OPEN thus modified is no longer only a message to declare the configuration parameters of the device it sends, but becomes a message conveying a command to apply the configuration elements it contains, and which is intended to be executed by the device to which it is addressed.

This embodiment advantageously proposes to exploit a conventional message format, which is described in the specification of the BGP routing protocol (RFC 4271). It is thus possible to minimize the number of messages exchanged between the two devices.

It is noted that there is no limitation attached to the way in which said session establishment message is modified to be interpreted as a control message. This can be done, for example, via the addition of an option in the message or of a new field comprising the configuration elements to be used.

In addition, other types of messages can be used to convey and propagate the configuration elements within the network. For example, a Router Advertisement (RA) message can also be adapted to convey the commands relating to the configuration to be applied to activate the routing protocol within the network. A Router Solicitation (RS) message can also be adapted and used for this purpose. The RA and RS messages according to the prior art have been described in the specification of the protocol "Neighbor Discovery for Internet Protocol version 6" (RFC 4861).

In a particular embodiment, said at least one session management instruction comprises at least one setpoint among:
    a setpoint to establish a session according to said routing protocol with all the devices of the network in direct relation;
    a setpoint to establish a session according to said routing protocol with all the devices of the network in direct relation via a predetermined interface;
    a setpoint intended to be applied by at least one device of the network to establish a session according to said routing protocol with all the devices of the network in direct relation and which belong to the same hierarchical level in the network; and
    a setpoint to establish a session according to said routing protocol with at least one device whose routing identifier is included in said setpoint.

By "direct relationship" is meant all the devices connected to the considered device.

Said routing identifier can be for example an IP address or a domain name.

For example, said predetermined interface is an interface identified by an even index, an interface identified by an odd index, or all interfaces identified by a multiple index of a predetermined integer (for example, the communication of an integer 2 is an indication to apply the configuration to the interfaces identified by an index multiple of 2: Interface[2], Interface [4], . . . ).

In a particular embodiment, if no setpoint is indicated in the configuration elements as for the management of the sessions per se, the recipient device proceeds by default to the establishment of sessions according to said routing protocol with each of the devices of the network that are directly connected thereto.

This embodiment allows reducing the setpoints to be transmitted in the configuration elements, and therefore the associated signaling. In addition, it is no longer necessary to explicitly activate with each device of the network, via a prior configuration, the establishment of sessions using the dynamic routing protocol with its neighbors. This can be done dynamically and automatically thanks to the setpoints gradually conveyed by the invention.

The different setpoints mentioned above allow taking into account the size and topology of the network (for example its organization in hierarchical levels, when appropriate) in the definition and the implementation of the routing policy. In addition, they allow detailing with the appropriate level of accuracy the routing policy envisaged by selecting the devices that must establish together sessions according to the routing protocol.

Thus, for example, the automated BGP session establishment with each of the devices of the network in direct relation with the device at the origin of the session establishment request is particularly adapted to the small-sized networks with a small number of hierarchical levels.

Likewise, the setpoints limiting the establishment of sessions with devices via a predetermined interface or belonging to a particular hierarchical level can be applied in networks of larger dimensions and thus facilitate the organization and dynamic implementation of clusters within these networks.

Of course, these examples of setpoints are only given for illustrative purposes. Other setpoints can be envisaged, defined for example from regular expressions making it possible to create filters on the basis of various parameters such as the interfaces supported by the devices or the hierarchical levels to which the devices belong in the network, etc.

Similarly, the management instructions are not limited to setpoints for the establishment of sessions with other devices, and may include other types of setpoints, such as in particular setpoints for the selection of parameters for the establishment of the sessions, such as for example a setpoint for the allocation of an AS number.

In a particular embodiment, the first message may comprise, among the configuration elements, an AS number to be used by the first device and possibly at least one predefined range of values for the selection of AS numbers that can be used by devices of the network. Said range of values can be contiguous or non-contiguous.

This embodiment offers the possibility of allocating dynamically and in a distributed manner AS numbers to the devices of the network.

By way of example, said at least one management instruction may comprise a setpoint for the selection of an AS number according to a predetermined strategy. There is no limitation attached to the strategy indicated in the setpoint: it can for example be the selection of an AS number in a predefined range of values randomly, or incrementally.

In particular, when the configuration elements comprise at least one predefined range of values for the selection of AS numbers, the configuration method can further comprise a step of allocating, by the first device to said at least one second device, at least an AS number selected from said at least one range of values as well as a range of values to be allocated to neighbors.

The invention makes it possible, in these embodiments in which an AS number, or one or more ranges of values of AS numbers to select such numbers, are present among the configuration elements, to provide the devices of the network with the AS numbers they need to establish BGP sessions. The provision of several ranges of values allows differentiating the assigned AS numbers, according for example to the hierarchical levels.

Thus, it is not necessary to configure beforehand each device of the network with at least one AS number associated thereto as well as with the AS numbers associated with its possible neighbors, but this configuration can be made dynamically and automatically thanks to the invention, and in a distributed manner over all the devices of the network.

It should be noted that the invention does not impose any constraint concerning the assignment of the AS numbers within the network: it applies regardless of the format of these numbers (typically coded on 16 or 32 bits), and both when a single AS number is used by all the devices of the network and when separate AS numbers are assigned to different hierarchical levels, or even to different clusters within the same hierarchical level.

In addition to the AS numbers or ranges of values from which to select these numbers, the configuration elements included in the first message may comprise other types of parameters likely to be involved in the management of the sessions according to the routing protocol.

Thus, in a particular embodiment, the configuration elements comprised in the first message further comprise at least one among:
 a cluster size for at least one hierarchical level of the network;
 a type of routes to be advertised by means of the routing protocol;
 a list of route reflectors used when appropriate in the network;
 a BGP confederation identifier of autonomous systems; and
 at least one timer value to be applied during sessions according to said routing protocol.

Of course, these parameters are given for illustration only and are optional; other parameters can be considered and conveyed in the first message and, when appropriate, in the second message propagated according to the invention.

In a particular embodiment, the configuration method comprises a step of detecting that one said second device is already configured for the activation of the routing protocol, said detection step leading to a cancellation of the step of sending the second message to this second device.

This embodiment makes it possible to take into account the configurations already made in the network.

In another particular embodiment, the configuration method comprises a step of detecting that one said second device is already configured for the activation of the routing protocol, said detection step leading to maintaining the step of sending the second message to this second device, the second message however containing only information likely to be used by the neighbors of the second device.

For example, the second message may contain only a list of AS numbers intended to be allocated to neighbors of the second device. This embodiment makes it possible to take into account the local configuration of a device, but to relay configuration information likely to be used by the neighbors of the second device.

As mentioned previously, the invention has a preferred application when the routing protocol implemented in the network is the BGP protocol. However, it also applies to other routing protocols, such as for example IS-IS or OSPF.

In a particular embodiment, the different steps of the configuration method are determined by computer program instructions.

Consequently, the invention also relates to a computer program on an information medium, this program being likely to be implemented in a device of a network such as a router or a switch, or more generally in a computer, this program including instructions adapted to the implementation of the steps of a configuration method as described above.

This program can use any programming language, and be in the form of source code, object code, or intermediate code between source code and object code, such as in a partially compiled form, or in any other desirable form.

The invention also relates to an information or recording medium readable by a computer, and including instructions of a computer program as mentioned above.

The information or recording medium can be any entity or device capable of storing the program. For example, the support may include a storage means, such as a ROM, for example a CD ROM or a microelectronic circuit ROM, or also a magnetic recording means, for example a hard disk.

On the other hand, the information or recording medium can be a transmissible medium such as an electrical or optical signal, which can be carried via an electrical or optical cable, by radio or by other means. The program according to the invention can in particular be downloaded on an Internet-type network.

Alternatively, the information or recording medium can be an integrated circuit in which the program is incorporated, the circuit being adapted to execute or to be used in the execution of the method in question.

The invention also relates to a communication system of a network using a dynamic routing protocol, this system comprising a plurality of devices according to the invention able to gradually propagate configuration elements related to the activation of the routing protocol in the network.

The system benefits from the same advantages mentioned above as the configuration device and method according to the invention. In particular, it allows the automatic activation of the dynamic routing protocol between the devices of the network.

In a particular embodiment, the communication system further comprises a controller comprising:
- a generation module, configured to generate a control message comprising configuration elements for the activation of the dynamic routing protocol in the network; and
- a sending module, configured to send said control message to at least one device of the network according to the invention.

This particular embodiment has a preferred but non-limiting application in a context where the network is based, for example, on an SDN architecture and comprises at least one network controller having the calculation logic necessary for the allocation of resources in the network and the dynamic implementation of different policies within the network, such as a routing policy for carrying and routing the traffic, a traffic engineering, service quality policy, etc. In such a context, it can be envisaged that this controller, which has a global and systemic vision of the network, and particularly a knowledge of its topology, is configured to determine, according to the defined routing policy, the elements for configuring the different devices of the network necessary for the activation of the routing protocol in the network, and send a first control message containing all these configuration elements to one or several device(s) of the network so that it or they propagate(s) these configuration elements towards the other devices of the network.

In a preferred embodiment, in order to limit signaling within the network, the controller addresses the control message with the configuration elements for the activation of the routing protocol to a single device of the network.

Alternatively, the network may not have a centralized entity (e.g. a controller). In this case, the first control message containing the configuration elements characteristic of the dynamic routing policy which must be implemented by all devices of the network can be transmitted "manually" by an operator of the network (e.g. via an appropriate script) to any one of the devices of the network which is then responsible for propagating the configuration elements towards the other devices of the network according to the invention.

In a particular embodiment, the communication system further comprises at least one additional device configured to refuse to apply the second control message received from one said first device of the network. Such an additional device is for example a device which is not compatible with the configuration method according to the invention or which is configured not to accept the configuration which is proposed thereto by the control message it has received.

The invention thus makes it possible to take into account the specific features of some devices which have particular functions in the network, such as for example the devices of the network which are responsible for the exchange of routes with the world outside the network (e.g. the Internet). Also, the invention makes it possible to instruct a device to accept or refuse the automatic configuration proposals by setting within each device of the concerned network a parameter at a value "TRUE" for example, if the device is compatible with the invention and at a value "FALSE" otherwise. The value of this parameter can be modified by an operator if necessary.

It can also be envisaged in other embodiments that the configuration method, the device as well as the communication system according to the invention, have in combination all or part of the aforementioned characteristics.

BRIEF DESCRIPTION OF THE DRAWINGS

Other characteristics and advantages of the present invention will emerge from the description given below, with reference to the appended drawings which illustrate an exemplary embodiment thereof devoid of any limiting character. In the figures:

FIG. 5A represents a BGP message OPEN as described in the document RFC 4271;

FIG. 5B represents a BGP message OPEN modified for the implementation of the invention;

FIG. 5C illustrates a field of the modified BGP message OPEN of FIG. 5B;

FIG. 6 represents the format of a modified RA message for the implementation of the invention;

FIG. 7 illustrates an example of application of the invention for the automatic discovery of an AS number and the automatic establishment of a BGP session between two devices of a network; and FIG. 8 represents an example of application of the invention following the addition of devices in a network.

DETAILED DESCRIPTION OF THE INVENTION

Figure 1:
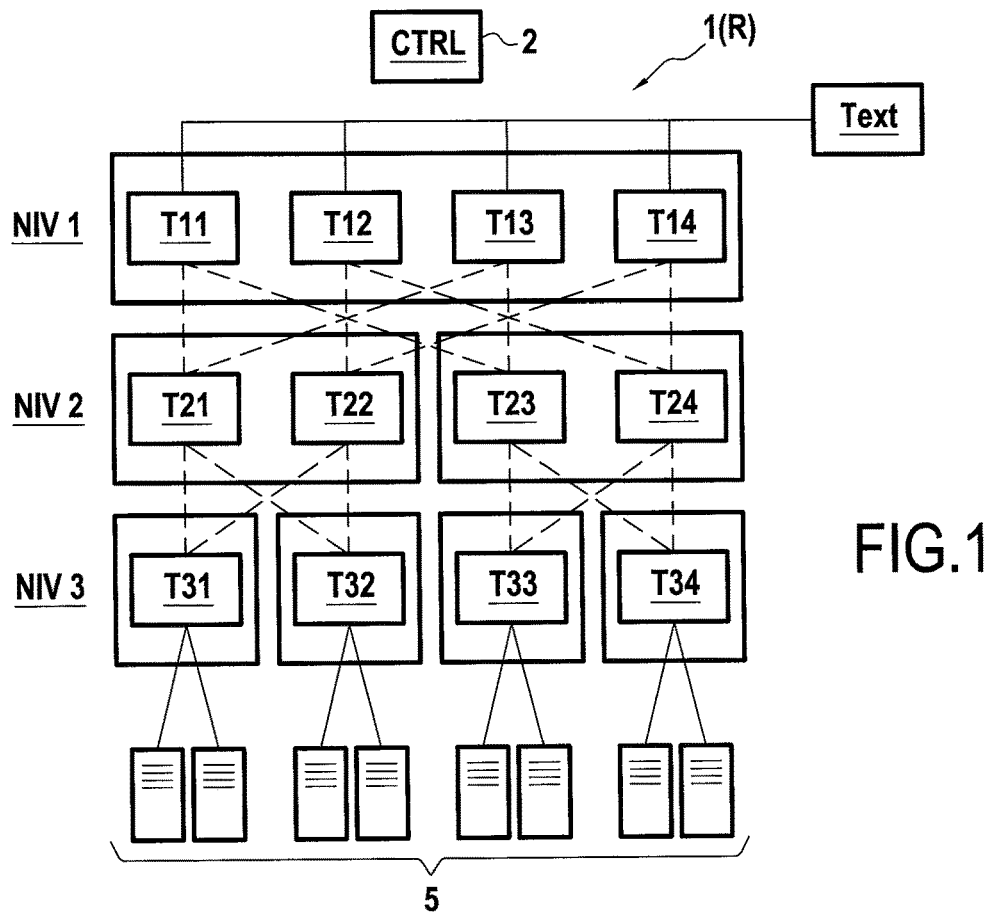
FIG. 1 diagrammatically represents a communication system according to the invention in a particular embodiment.

FIG. 1 represents, in its environment, a communication system 1 according to the invention, in a particular embodiment.

In the example envisaged in FIG. 1, the communication system 1 comprises a plurality of network devices (generally designated by T), all complying with the invention and belonging to the network infrastructure of a data center (DC). The devices T are interconnected via one or more communication interfaces (illustrated in the figure in broken lines) and form a communication network R.

There is no limitation attached to the nature of the network devices T (also called nodes of the network R): these are any network elements, such as routers, switches, etc. No limitation is attached either to the nature of the communication interfaces used by the devices T to communicate together within the network R. They may be mobile or fixed, wired or wireless communication interfaces, etc.

The communication network R formed by the devices T uses a dynamic routing protocol. The invention allows automatic and distributed configuration of the different network devices T with a view to activating this dynamic routing protocol in the network R.

In the embodiment described here, the considered dynamic routing protocol is the BGP protocol. The invention can be applied to other dynamic routing protocols, such as for example to other routing protocols using AS numbers or a similar concept (for example, ITAD (IP Telephony Administrative Domain) identifiers used by the TRIP protocol (described in particular in the document RFC3219), or also the area numbers (parameter "Area ID") used by OSPF routers (described in particular in the document RFC 2328)). For example, the value of the parameter "Area ID" can be allocated automatically by an OSPF router following a first instruction configured locally or communicated by a controller.

The network infrastructure on which the data center is based here implements SDN architecture. However, the use of SDN is not a prerequisite for this invention.

This infrastructure comprises, in addition to the network devices T, a controller 2 allowing coherent and deterministic operation of the network R of the data center. The controller 2 has, in a known manner, a global and systemic vision of the network R, of its topology, of its components, of the (virtualized or non-virtualized) network functions available, of their status, etc. This controller 2 is capable of defining a routing policy within the network R, based on the BGP protocol, and making it possible to carry the data center traffic in accordance with the objectives set by the operator of the data center. It is, in the example illustrated in FIG. 1, connected to one of the network devices T, namely to the device T11.

Figure 2:
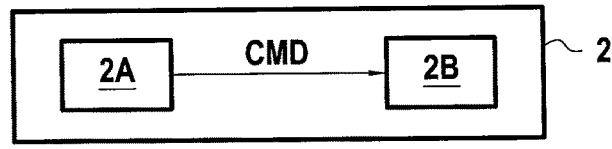
FIG. 2 represents a controller belonging to the communication system of FIG. 1.

To apply this routing policy within the communications network and system 1, the controller 2 has, as illustrated in FIG. 2:

- a generation module 2A, configured to generate a CMD control message comprising configuration elements for the activation of the BGP dynamic routing protocol in the network and reflecting the routing policy desired by the operator of the data center. The configuration elements comprised in the CMD control message will be detailed later. They may have been defined in whole or in part by the operator of the data center so as to reflect the routing policy that he wishes to apply within the network R, and have been transmitted by the operator to the controller 2 and to its generation module 2A by using means known per se, such as by connecting directly on the controller 2 by means of a Telnet session or via a script; and
- a sending module 2B, configured to send the control message thus developed to at least one device selected by the controller 2 among the devices T. In the example described in FIG. 1, it is assumed that the controller 2 sends the developed control message to a single device. The way in which the controller 2 selects this single device (or the devices to which it sends the control message if several devices are selected) depends on engineering choices, on the topology of the network, etc.

In the example illustrated in FIG. 1, the communication system 1 is organized into a plurality of hierarchical levels (three in FIG. 1 referenced by NIV1, NIV2 and NIV3), each hierarchical level being itself organized into one or more clusters (i.e. groups) of devices: a cluster for the hierarchical level NIV1 comprising four devices T11, T12, T13 and T14, two clusters for the hierarchical level NIV2 comprising respectively two devices T21 and T22, and two devices T23 and T24, the hierarchical level NIV3 comprising four devices T31, T32, T33 and T34 each belonging to a separate cluster. The network devices of the last hierarchical level NIV3 are connected here to the different virtual or hardware machines (for example servers) of the data center (generally referenced S).

Of course, this network infrastructure architecture and its organization into hierarchical levels and into clusters is given only by way of illustration, and the invention applies to other types of architectures (having a central unit such as the controller 2 or not). The choice of the architecture of the network R comes under the engineering and the topology of the network, under the size of the data center, etc.

As mentioned previously, the use of the dynamic routing protocol BGP within the network R formed by the devices T requires the allocation of AS numbers to each of these devices. In the example considered in FIG. 1, the following choices are made by the operator of the data center for this allocation:

- use of private AS numbers (belonging to the range 64512-65524 or to the range 4200000000-4294967294 in the case of AS numbers coded on 4 bytes); and
- use of the same AS number for the network devices located at the same hierarchical level and belonging to the same cluster.

This AS number allocation policy is given for illustrative purposes only. Other policies can be adopted by the operator of the data center (for example, same AS number for all devices belonging to the same hierarchical level, same AS number for all devices of the network, etc.).

As indicated above, the devices T of the network R here all comply with the invention. In other words, they are equipped with means allowing them to gradually propagate the configuration elements of the network linked to the activation of the routing protocol in the network R, and comprising the parameters and the routing policies to be applied upon establishment of the BGP sessions and as long as the BGP sessions are maintained.

Figure 3A:
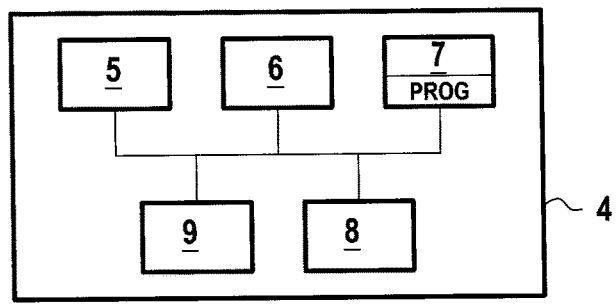
FIGS. 3A and 3B respectively represent the hardware architecture and the functional architecture of a network device according to the invention and belonging to the communication system of FIG. 1.

In the embodiment described here, the devices T of the network R according to the invention have the hardware architecture of a computer 4 as illustrated in FIG. 3A. They comprise in particular a processor 5, a random access memory 6, a read-only memory 7, a non-volatile flash memory 8, as well as communication means 9 comprising one or more communication interfaces, each identified by an index (i.e. an integer).

The communication means 9 allow each device T to be connected to one or more other devices T of the network R, and to communicate with these other devices in particular for routing and carrying the traffic within the network, by using the BGP protocol. To this end, the devices T are configured here to listen by default on the TCP port 179, in order to receive the messages relating to the BGP protocol and particularly the messages OPEN requesting the establishment of BGP sessions. In order to differentiate the procedure proposed by the invention from the one defined by the current standard, other port numbers can be used if and only if all the devices have been properly instructed beforehand.

The read-only memory 7 of each network device T constitutes a recording medium according to the invention, readable by the processor 5 and on which a computer program PROG according to the invention is recorded.

Figure 3B:
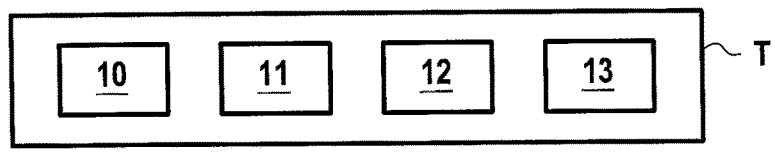

The computer program PROG defines functional (and here software) modules of the network device T, configured to implement the steps of the configuration method according to the invention. The functional modules defined by the program PROG are based on and/or control the hardware elements 5-9 of the computer 4 mentioned above. They comprise in particular here, as illustrated in FIG. 3B:

a receiving module 10 able to receive a first control message comprising configuration elements related to the activation of the dynamic routing protocol (here BGP) in the network R;

a configuration module 11 adapted to configure session establishment parameters according to the BGP routing protocol, used by the network device T from configuration elements comprised in the first message; and an execution module 12, activated if the configuration elements comprised in the first message comprise at least one session management instruction according to the BGP routing protocol in the network, to execute this session management instruction; and a propagation module 13, activated if the configuration elements comprised in the first message comprise a setpoint for the propagation of the configuration elements in the network, and configured to send at least one second control message to at least one second device of the network R in accordance with said propagation setpoint. The second control message sent by the propagation module 13 comprises all or part of the configuration elements comprised in the first message, these being intended to be applied by the second device to activate the dynamic routing protocol in the network R.

Figure 4:
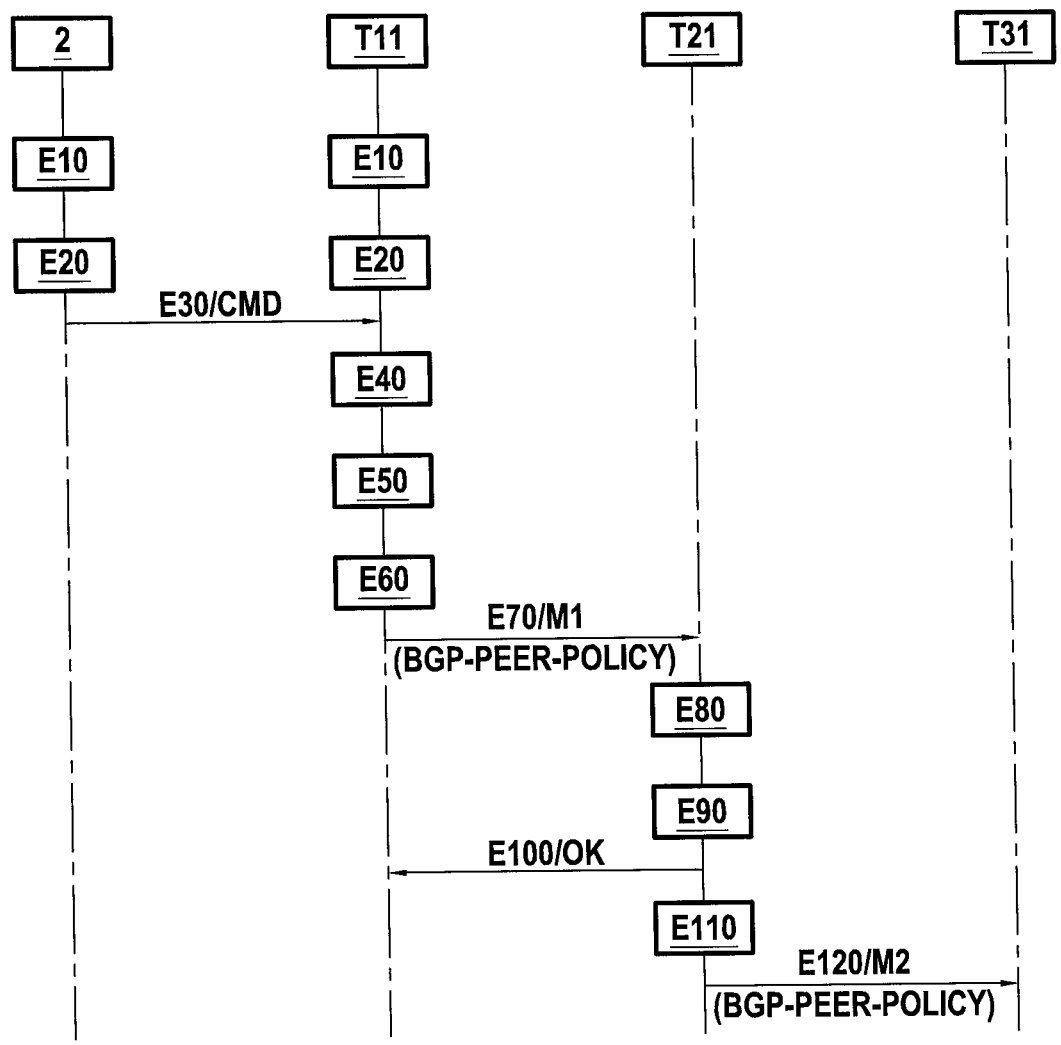
FIG. 4 represents the main steps of a configuration method according to the invention as implemented by a network device illustrated in FIGS. 3A and 3B.

There are now described, with reference to FIG. 4, the main steps implemented according to the invention for the configuration of the network devices T in order to activate within the network R the BGP dynamic routing protocol. By way of illustration, there are envisaged in FIG. 4 the steps implemented by only three elements of the network R, namely, by the controller 2, by the network device T11, and by the network device T21 illustrated in FIG. 1. The steps implemented by the network devices T11 and T21 correspond to the steps of the configuration method according to the invention.

It is assumed here as a preliminary that the controller 2 has received, from the operator of the data center, different configuration elements defining the routing policy it wishes to apply within the network R (step E10). This can be done via an explicit configuration of the controller 2 by the operator of the data center, for example by connecting thereto via a Telnet session, or by using a protocol such as NETCONF. These configuration elements include in particular parameter values intended to be used by the devices T upon establishment of BGP sessions (for example AS numbers, timer values), various instructions for the management of BGP sessions within the network R such as for example setpoints relating to the establishment of the BGP sessions, to the allocation of AS numbers, as well as setpoints for the propagation of the configuration elements between the different devices T of the network, etc. These elements will be described in more detail later.

Following its configuration by the operator of the data center, the controller 2, via its generation module 2A, forms and then generates a CMD control message comprising the configuration elements allowing the activation of the BGP routing protocol in the network R (step E20). In the embodiment described here, this CMD control message is for example a message BGP_PEER_POLICY. It should be noted that such a message is today non-existent in the BGP protocol and therefore requires to be defined for the implementation of the invention. By control message is meant a message conveying instructions intended to be applied (executed) by the recipient of the message, as opposed to a declaration message which, when sent by a device of the network, is intended to inform the other devices of the network of the parameters it uses.

The CMD control message comprises, in the embodiment described here, a certain number of fields, namely:

a field ID comprising an instruction (setpoint) relating to the management of the BGP sessions in the network R (instruction for the management of BGP sessions within the meaning of the invention) and to the propagation of the configuration elements allowing the activation of the BGP protocol. More precisely here, this instruction comprises a setpoint relating to the establishment of the BGP sessions in the network R and to the propagation of the configuration elements. The field ID can take a plurality of values reflecting different setpoints.

By way of example:

the value 0 reflects a setpoint requiring the establishment by the network device receiving this setpoint, of a BGP session with all devices of the network being in direct relation therewith, and the propagation of the configuration elements towards these devices;

the value 1 reflects a setpoint requiring the establishment, by the network device receiving this setpoint, of a BGP session with all devices of the network in direct relation therewith via an interface of odd index, and the propagation of the configuration elements towards these devices;

the value 2 reflects a setpoint requiring the establishment, by the network device receiving this setpoint, of a BGP session with all the devices of the network in direct relation therewith via an interface of even index, and the propagation of the configuration elements towards these devices;

the value 3 reflects a setpoint requiring the establishment, by the network device receiving this setpoint, of a BGP session with all devices of the network in direct relation therewith via an interface of multiple index of an integer n (n being defined by the setpoint and designating an integer greater than 1), and the propagation of the configuration elements towards these devices;

the value 4 reflects a setpoint requiring the establishment, by the network device receiving this setpoint, of a BGP session with all devices of the network in direct relation therewith and belonging to the same hierarchical level, and the propagation of the configuration elements towards these devices; and the value 5 reflects a setpoint requiring the establishment, by the network device receiving this setpoint, of a BGP session with all devices explicitly reported in said setpoint (on the basis of their routing identifiers), and the propagation of the configuration elements towards these devices.

These examples of setpoints and the values associated therewith are given for illustrative purposes only. Other values and other setpoints can be defined for the field ID; regular expressions can be used to define filters, applied for example on the interfaces of the network device or on the hierarchical levels and to explain how the propagation of the configuration elements must be performed in the network R between the devices T. In addition, the BGP session management instructions which are described in the field ID can comprise other types of setpoints such as for example setpoints for the selection of an AS number according to a predetermined strategy (for example randomly or incrementally within a predetermined range of values, etc.). Any type of setpoint intended to allow the application by the network devices T of the routing policy desired by the operator of the data center can be defined and valued in the field ID;

- a field AS_NUMBER, indicating the AS number value that the network device receiving the CMD message should use upon establishment of its BGP sessions. If this field contains several values, then the device chooses at least one value for its own use, the rest being possibly used to allocate AS numbers to neighbors;
- a field SUPPLIED_ASN_RANGE containing one or more ranges of values allowing the dynamic allocation of AS numbers to the neighbors of the network device receiving the CMD message. This dynamic allocation can be performed according to a predetermined strategy (for example incremental, random strategy or the like) by the network device receiving the CMD message itself or directly by the neighbors to which it transmits the value of the field. Note that variants of the field SUPPLIED_ASN_RANGE can be envisaged, for example:
  SUPPLIED_ASN_RANGE_ALL: which specifies a range of values that can be used by all hierarchical levels;
  SUPPLIED_ASN_RANGE_LL: which specifies a range of values that can be used for the allocation of AS numbers to neighbor devices belonging to a lower level;
  SUPPLIED_ASN_RANGE_UL: which specifies a range of values that can be used for the allocation of AS numbers to neighbor devices belonging to a higher level;
- a field CLUSTER_SIZE, indicating the cluster size considered for each hierarchical level (for example, two nodes for the hierarchical level NIV2). Several variants of this field can be considered, for example:
  CLUSTER_SIZE_ALL: which specifies the recommended size to automatically form the clusters of all hierarchical levels;
  CLUSTER_SIZE_LL: which specifies the recommended size to automatically form the clusters of a lower hierarchical level;
  CLUSTER_SIZE_UL: which specifies the recommended size to automatically form the clusters of a higher hierarchical level;
- a field ROUTE_TYPES, specifying the type(s) of routes to be advertised, such as, for example, the IPv4 routes, the IPv6 routes, the VPN (Virtual Private Network) routes, the unicast routes, the multicast routes, etc.;
- a field RR_LOCATORS, specifying a list of route reflector (or RR) locators used when appropriate in the network, in order to allow the establishment of the BGP sessions with these route reflectors; and
- a field BGP_TIMERS comprising a list of values of the different BGP timers intended to be applied during BGP sessions. These timers can be in particular the known timers ConnectRetryTime, HoldTime, KeepaliveTime, MinASORiginationIntervalTimer, and MinRouteAdvertisementIntervalTimer. In the embodiment described here, the absence in this field of the value of one of the aforementioned timers means that the default value of this timer must be used (for example, 120 s for ConnectRetryTime, 90 s for HoldTime, the third of the value of HoldTime for the KeepaliveTime time, 15 s for MinASORiginationIntervalTimer, etc.).

Note that these different fields are only given for illustrative purposes, and either a subset of these fields or additional fields can be used (such as a field in which the controller 2 includes a list of the IP addresses of the network devices belonging to the same hierarchical level), when appropriate. The fields CLUSTER_SIZE, ROUTE_TYPES, RR_LOCATORS or BGP_TIMERS are typically optional and depend on the topology of the network, on its cluster engineering, or on the routing policy. The absence of one of these fields in the CMD message can mean that the values defined by default by the BGP protocol must be applied, or that this field is not applicable (for example, because there is no route reflectors in the network). However, the CMD message comprises preferably at least the field ID comprising instructions for the management of the BGP sessions and the field AS_NUMBER and/or the field SUPPLIED_ASN_RANGE for the allocation of the AS numbers in the network.

Once the control CMD message has been developed, the controller 2 sends it here via its sending module 2B to a single network device T of the network R, namely to the network device T11 in the example described here (step E30). The selection of this device can depend on different criteria: it is for example a network device connected directly to the controller 2, but other selection rules depending on the hierarchical levels, on the data center, etc. can be envisaged.

Alternatively, the controller 2 can decide to send the CMD message to several network devices T. However, the advantage of sending this message to only one device is to limit the volumetry of the signaling induced by the automatic configuration of the network.

The network device T11 receives, via its receiving module 10, the CMD message (first control message within the meaning of the invention for the device T11), and extracts from this message the configuration elements (setpoints and parameters) received from the controller 2 and related to the activation of the BGP routing protocol in the network R (step E40).

Following this extraction, it configures via its configuration module 11, the values of the parameters it uses to establish BGP sessions from the parameters and setpoints it has extracted from the control message (step E50).

Thus, in the example envisaged here, the configuration module 11 configures the AS number of the device T11 at the value given by the field AS_NUMBER of the CMD message.

Similarly, it configures the value of the timers such as ConnectRetryTime, HoldTime, KeepaliveTime, MinASORiginationIntervalTimer, or MinRouteAdvertisementIntervalTimer with the values extracted from the field BGP_TIMERS of the CMD message, etc. Note that if the CMD message comprises a configuration of an interface that is not yet activated on the network device T11, it stores the appropriate configuration for this interface so that it can be used later when the interface is activated.

Furthermore, according to the invention, the network device T11 executes, through its execution module 12, the BGP session management instructions comprised, when appropriate, in the CMD message (step E60). In this case, in the example envisaged here, these management instructions comprise an instruction to establish BGP sessions with all or part of its neighbors (as a function of the value of the field ID).

To establish these BGP sessions, the network device T11 must know (and make an advertisement of) the AS numbers associated with each of its neighbors and used thereby during BGP sessions. These AS numbers may vary according to the value of the field ID and the routing policy specified by the operator.

Thus, for example:
- if the field ID has the value 0, the same AS number is associated with the neighbors of the network device T11;
- if the field ID has the value 1, 2 or 3, the same AS number or a different AS number (depending on what is imposed by the field ID) is associated with the neighbors of the network device T11 with which the latter establishes sessions. If a different AS number is required by the field ID, it is selected by the T11 device in the range of values SUPPLIED_ASN_RANGE;
- if the field ID has the value 4 and the routing policy desired by the operator of the network imposes the same AS number on all network devices belonging to the same hierarchical level, the same AS number as the one associated with the device T11 (that is to say the one indicated by the field AS_NUMBER of the CMD message) is associated with the neighbors of the network device T11 with which the latter establishes sessions.

Of course, these examples are only given by way of illustration.

At the end of this configuration, the network device T11 has all the elements it needs to establish BGP sessions with its neighbors (in other words, with the network devices with which it is directly connected) in the network R.

In the embodiment described here, the value of the field ID also indicates to the network device T11 how to propagate the configuration elements received in the CMD message towards its neighbors. It therefore conveys a propagation setpoint within the meaning of the invention.

In an alternative embodiment, this propagation setpoint is implicit as soon as a BGP session establishment setpoint with all the neighbors or with determined neighbors of the network device is comprised in the CMD control message received by the network device. In other words, in this variant, the presence of such a BGP session establishment setpoint with all of its neighbors or with determined neighbors is considered by the network device T11 (and more specifically by its module 13) to be also a setpoint for propagation towards these same neighbors of the configuration elements comprised in the control message, so that the presence of the BGP session establishment setpoint automatically activates the propagation of the configuration elements by the propagation module 13 of the network device T11 to the neighbors identified in the BGP session establishment setpoint.

In the embodiment described here, the propagation of the configuration elements (by the propagation module 13) and the establishment of the BGP sessions (by the execution module 12) are performed by sending the same message M1 to each concerned neighbor. This message M1 is a BGP message OPEN to establish a BGP session, modified so as to include new fields comprising all or part of the configuration elements extracted from the CMD message and which must be applied by the network device which receives the message M1. The modified message includes here particularly one or more AS numbers to be used by the network device recipient of the message and determined by the network device T11 as a function in particular of the value of the fields ID, AS_NUMBER and SUPPLIED_ASN_RANGE as indicated above.

The message OPEN used by the BGP protocol is described in the document RFC 4271, like the other messages KEEPALIVE, UPDATE and NOTIFICATION which can be exchanged between two network devices under the BGP protocol. Its structure and content are illustrated in FIG. 5A, and cited below. The BGP message OPEN comprises the following fields:
- a "My autonomous system" field, which indicates the AS number of the network device that has emitted the OPEN-type message;
- a "Hold time" field, which indicates the proposal (expressed in seconds) of the network device that has emitted the OPEN-type message for the maximum value of the period of time which elapses between the receipt of two consecutive KEEPALIVE-type (and/or UPDATE-type) messages. Upon receipt of the message OPEN, a BGP router must calculate this value, by comparison with the one reported in the "Hold Time" field of the received message, and the one that was communicated by other BGP neighbors, by a controller, or use a default value.
- a "BGP identifier" field, which typically corresponds to the IP (Internet Protocol) address assigned to the network device emitting the message OPEN for its identification (in the sense of the BGP connection); and
- an "Optional parameters" field, containing the list of the optional parameters likely to be conveyed in the OPEN-type message. These parameters are coded according to the TLV (Type Length Value) principle.

The message OPEN thus defined aims on the one hand at establishing a BGP session with the network device to which it is sent, and on the other hand at allowing the network device emitting this message to announce the parameters it uses during its BGP sessions (for example AS number, or IP address).

In the embodiment described here, the BGP session establishment and advertisement message OPEN is modified to become a BGP session establishment and control message making it possible to configure the network device to which it is addressed by the device. T11. To this end, as indicated previously and illustrated in FIG. 5B, a new field BGP_PEER_POLICY is added to the message OPEN. In the embodiment described here, this field can comprise one or more BPP objects structured according to a TLV encoding, depending on the number of configuration elements to be transmitted (for example, one object per configuration element). More specifically, each object is defined by, as represented in FIG. 5C:
- a type BPPType, i.e. by a code reporting that it is a BGP_PEER_POLICY-type object containing configuration elements intended to be applied or executed by the network device that receives it;
- a length BPPLength, which indicates the size of the object; and
- a subtype BPPSubType indicating the BGP_PEER_POLICY-type object included in the message OPEN, i.e. the type of configuration elements described by this object. As an example, the following values can be defined for this subtype:
  0: to provide an AS number to the network device recipient of the message OPEN to establish the BGP session;
  1: to provide timer values;
  2: to provide a range of values among which the recipient of the message OPEN can select an AS number (this range can be global, or specific to each hierarchical level, etc.);
  3: to provide a BGP session management instruction, this instruction being able to be structured in an identical or similar manner to what has been described previously for the field ID of the CMD message;
  etc.

The choice of the number of subtypes and their values depends on the configuration elements that may be transmitted via the modified message OPEN; and the value BPPValue of the configuration element identified by the subtype BPPSubType (for example, the AS number if the subtype BPPSubType is 0, the range of ASN values if the subtype BPPSubType is at 2, etc.).

The network device T11 reports via its propagation module 13, the field BGP_PEER_POLICY of each modified message OPEN intended for one of its neighbors, with the configuration elements intended to be applied by this neighbor. If in the management instructions, it has received the instruction to allocate an AS number to its neighbors among one or more ranges of predefined values, the execution module 12 allocates these AS numbers according to the strategy it has been requested to apply, and the propagation module 13 reports these AS numbers in an object BGP_PEER_POLICY. The object BGP_PEER_POLICY can further comprise a list of the IP addresses associated with network devices.

In another embodiment of the invention, the propagation module 13 can add to the modified OPEN message configuration elements obtained by another means than by the CMD control message received from the controller 2. It is for example possible to envisage a case of application of the invention in which the network device 11 has received two control messages derived from two different controllers and propagates to its neighbors a message comprising configuration elements derived from the two control messages (complementary configuration elements comprised in each of the messages) or selected from the two control messages (for example, if some of the configuration elements are contradictory).

Once the control messages M1 are generated (second control messages within the meaning of the invention for the device T11), these are sent by the network device T11 to their recipients (as identified in the propagation instructions reported in the field ID of the CMD message), via its propagation module 13 (step E70).

Note that in the embodiment described here, if the network device T11 detects that one of the neighbors to which it must send a control message M1 in accordance with the session management and/or propagation instructions it has received, is already configured to activate the BGP protocol (for example, this same neighbor has previously sent thereto a message OPEN to establish a BGP session including an AS number and thereby indicating that it is already configured to use the BGP protocol), the network device T11 cancels the sending by its execution module 12 of the control message M1 to this neighbor.

For the sake of simplification, only the sending of the control message M1 containing the field BGP_PEER_POLICY to the network device T21 is represented in FIG. 4.

The network device T21 receives, via its receiving module 10, the control message M1 (first control message within the meaning of the invention for the device T21), and extracts from this message the configuration elements (setpoints and parameters) included in the BGP_PEER_POLICY field and related to the activation of the BGP routing protocol in the network R (step E80).

Following this extraction, it configures via its configuration module 11, the values of the parameters it uses to establish BGP sessions from the parameters and setpoints it has extracted from the control message M1 (for example AS number, etc.), as previously done by the network device T11 from the configuration elements comprised in the CMD message (step E90). At the end of this configuration, the network device T21 has all the elements it needs to establish BGP sessions with its neighbors in the network R.

It further accepts the establishment of the BGP session with the network device T11 (step E100).

Then, according to the invention and as previously done by the network device T11, the network device T21 applies, via its execution module 12, the BGP session management and propagation instructions comprised in the message M1 (step E110). In this case, in the example envisaged here, these management instructions comprise an instruction to establish BGP sessions with all or part of its neighbors (as a function of the value of the field ID) and an instruction to propagate the configuration elements towards these same neighbors (propagation instruction within the meaning of the invention). To this end, the network device T21 emits a control message M2 to each of its neighbors identified in the session management instructions it received in the message M1. This message M2 is based on a modified message OPEN as described above and illustrated in FIG. 5B, and whose field BGP_PEER_POLICY is reported with the configuration elements extracted from the message M1 which concern the neighbors in question of the network device T21.

The messages M2 thus developed (second control messages within the meaning of the invention for the device T21) are sent by the network device T21 to their recipients via its execution module 12 (step E120).

The recipients of the messages M2, upon receipt thereof, in turn apply the configuration elements contained in these messages, establish the required BGP sessions, and continue to propagate these elements gradually until all the network devices T are configured. In other words, the steps previously described for the network device T21 are repeated by all devices of the network receiving a control message from one of its peers containing configuration elements. It is noted that the control messages propagated towards the devices of the network belonging to the lower hierarchical level (NIV3 in the example of FIG. 1) preferably do not contain an instruction to propagate the configuration elements; if they do, they are preferably not taken into account by the devices in question, since these no longer have neighbors to configure to which to transmit these configuration elements.

In addition, if configuration elements are updated by the controller 2, a procedure identical to that described above can be implemented to propagate these new configuration elements by using a message BGP UPDATE modified in an identical manner to what has been previously indicated for the message OPEN.

Furthermore, in the embodiment described here, if a device of the network R is already configured and receives a control message from one of its peers (neighbors) asking it to apply configuration elements according to the invention, this device is configured to refuse the configuration elements it has been requested to apply.

In another embodiment, if a (first) device of the network (for example T11 in the above example) able to implement the invention detects that a (second) device of the network R (for example T21 in the example above) to which it must transmit a control message comprising configuration elements in accordance with the propagation setpoints it has received, is already configured for the activation of the routing protocol, the first device cancels the sending of the control message to this second device.

Alternatively in such a context, the sending by the first device of the control message to this second device is maintained, but the control message only contains information likely to be used by the neighbors of the second device.

It is possible to envisage different ways for the first device to detect that the second device is already configured and to decide whether the control message should be sent or not.

Thus, according to a first option, the second device being already configured with an AS number, the latter can send to the first device, following the establishment of a TCP connection therewith, a BGP message OPEN comprising its AS number. The receipt of such a message making an advertisement of the AS number from the second device to the first device allows the first device to detect that the second device is already configured, and when appropriate, to cancel the sending of the control message to the second device. The first device can also decide to send such a control message, but the latter will contain only information likely to be used by the neighbors of the second device (for example session establishment parameters such as AS numbers or a range of AS numbers).

According to a second option, it can be envisaged that it is the second device that explicitly indicates to the first device that it needs configuration elements for its neighbors (for example, a range of AS numbers to allocate to its neighbors). To this end, the BPP object described previously with reference to FIG. 5C can include, in addition to the elements BPPType, BPPLength, Subtype and BPPValue, a specific bit, for example a bit R (for Request), set to 1 when the second device requires a configuration (for itself and/or for its neighbors) or to 0 when the BGP message OPEN is used to make an advertisement of an existing configuration. This BPP object can be included by the second device in the BGP message OPEN it sends to the first device following the establishment of a TCP connection therewith, as indicated previously for the first option. The presence of this bit set to 1 and the absence of local configuration announced in the BGP message OPEN sent by the second device is interpreted by the first device as an explicit request for configuration elements for the second device and for its neighbors.

According to a third option, following the detection of a connection established with the first device, the second device, if it is already configured, can send an advertisement message of its local configuration (and particularly its number AS) to the first device. Such a message can for example be an RA (Router Advertisement) or RS (Router Solicitation) advertisement message as described in the prior art and mentioned previously. It can be envisaged that this message contains an additional bit R as described in the second option for the BGP message OPEN, indicating to the first device that configuration elements from its neighbors are required from the first device. The receipt of such a message allows the first device to detect that the second device is already configured, and when appropriate, to deactivate the sending of the control message to the second device or to send a control message containing only information likely to be used by the neighbors of the second device (e.g. session establishment parameters such as AS numbers or a range of AS numbers).

It should be noted that other devices of the network R can be configured to refuse the application of the configuration elements which are transmitted thereto via the invention. These are, for example, devices placed at the edge of the network R and which carry the traffic towards the networks external to the network R (for example towards the Internet network). This is the case, for example, of the Text network device represented in FIG. 1.

To distinguish these devices from the other devices of the network applying the invention, it is possible to envisage the introduction of a new configuration parameter for each device of the network, named for example PEER_SUPPLIED_CONFIG, and which indicates whether the device of the network is compatible or not with the invention, in other words, whether it can be configured by one of its peers according to the invention or not. This parameter can be valued by default at "TRUE" for all devices on the network R, except for the devices located at the edge of the network and which exchange routes with devices or routers of external networks for which it must be valued at "FALSE". Thus, a device of the network R having a parameter PEER_SUPPLIED_CONFIG valued at "FALSE" is configured to ignore and reject any proposal of configuration elements sent by a neighbor (particularly if the latter contains a proposal of an AS number). Optionally, this device can send an error message to the emitter of the control message comprising the configuration elements so that the latter stops sending configuration elements thereto.

Thus, thanks to the invention, an automatic and distributed configuration of the devices of the network R is obtained allowing the activation of the BGP protocol: at the end of this configuration, the BGP sessions are established between all the peers in accordance with the desired routing policy by the operator of the data center and the BGP protocol is activated.

In the embodiment described above, the controller 2 emits a CMD control message containing the configuration elements to the network device T11 to which it is directly connected and the configuration elements are propagated gradually in the network R by means of modified BGP messages OPEN to establish BGP sessions.

In another embodiment, the network R does not comprise a controller having a centralized role, but only network devices such as routers. In such a context, rather than defining a new message BGP_PEER_POLICY and modifying the BGP message OPEN, the network R configuration elements related to the activation of the BGP routing protocol can be conveyed in RA messages exchanged between the devices T of a network, and more specifically in a newly defined option of this message (named for example BGP_PEER_POLICY). The "first" network device at the origin of the first control message gradually triggering the configuration of the other devices of the network can obtain the configuration elements related to the application of the BGP routing protocol as described above for the configuration of the controller 2 (for example, explicit configuration via a Telnet connection or via NETCONF). The sending of the RA message can be automatic or be the object of a response to an RS message.

FIG. 6 illustrates an example of format of the option BGP_PEER_POLICY. The "Validity period" field reports the validity period of the option. It is identical to the one defined for example in document RFC 6106. The BPP field of the new option thus defined can be structured according to the same formalism as that of the BGP_PEER_POLICY field of the modified message OPEN illustrated in FIG. 5B.

Note that in this context where an RA message is used to gradually convey the configuration elements between the network devices, a BGP session is established between two network devices via a message distinct from the message used to convey the configuration elements. Therefore, it is not necessarily the network device that transmits the control message comprising the configuration elements to one of its peers which is at the origin of the request for establishing a BGP session with this peer.

FIG. 7 illustrates an example of application of the invention. It represents a procedure for allocating and communicating automatically, by a network device N1, an AS number to a network device N2. When a link between the two network devices N1 and N2 is activated, the network device N1 immediately sends an RA control message comprising an option BGP_PEER_POLICY as illustrated in FIG. 8 and comprising among the configuration elements conveyed in this option, an AS number (65001 in the example illustrated) to be applied by the network device N2 and allocated by the network device N1. Also, this message includes the AS number of the device at the origin of the emission of the RA message. Upon receipt of the RA control message, the network device N2 extracts the AS number provided by the network device N1, and is configured with this AS number provided so as to activate the BGP protocol. At this stage, the network devices N1 and N2 have the configuration elements necessary for the establishment of a BGP session therebetween (i.e. their local AS number, and the AS number of the neighbor device. This can be established on the initiative of either of the devices. It should be noted that the automatic configuration of the network devices can be combined with an automatic discovery procedure of the elements for configuring the devices of the network by their peers. Thus, a device of the network configured according to the invention and having an AS number, can interrogate another device of the network via an RS solicitation message as soon as it detects a connection via one of its interfaces with this other network device. This RS message aims at acquiring its BGP configuration elements, and in particular its AS number. A BGP session is established automatically between the two network devices as soon as they have exchanged their AS numbers.

In the examples described above, the configuration of all devices of a network R has been envisaged to activate the use of the BGP protocol in this network. The invention can also be applied to configure devices (for example routers) added at any time by the operator of the data center to extend the capacities of its network R. FIG. 8 illustrates for example the addition of two devices T25 and T35 in the network represented in FIG. 1 when this does not comprise a controller 2. It is assumed that the AS numbers allocated to the other devices of the network R via the implementation of the invention are those represented in FIG. 8.

The newly added devices T25 and T35 do not have the information necessary to establish BGP sessions with their neighbors. It is assumed that these two devices comply with the invention, and that the device T25 is connected to the devices T11, T12, T13 and T14, and the device T35 to the device T25.

When the link T11-T25 is activated, an RA control message is emitted by the network device T11 comprising in the option BGP_PEER_POLICY the following configuration elements:

AS number to be used by the device T25: 64905;
cluster size of the lower level CLUSTER_LL=1;
range of values for the allocation of AS numbers to its neighbors belonging to a lower hierarchical level: [64601-64899];
timer values;
etc.

Note that in this example, the mention of a range of values in the option BGP_PEER_POLICY comprises an implicit instruction to the devices receiving the RA control message to draw on this range in order to allocate AS numbers to their neighbors (session management instruction within the meaning of the invention).

Upon receipt of this control message, the network device T25 extracts the configuration elements contained in the message and is configured therewith. Then a BGP session is automatically established between the network devices T11 and T25, on the initiative of the network device T11 or of the network device T25.

If links with the other network devices of the hierarchical level NIV1 are activated (for example, here with the devices T11, T12, T13 and T14), then the network device T15 can make an advertisement of its configuration and particularly of its AS number via RA messages with these devices. BGP sessions are then established automatically with these network devices.

Concomitantly with these exchanges, the network device T25 allocates, among the range of values communicated thereto by the network device T11, an AS number to the network device T35 of the hierarchical level NIV3 to which it is connected, in accordance with the session management instruction transmitted in the RA message received from the device T11. It sends an RA control message to the network device T35 comprising the AS number allocated thereto (e.g. 64605) and the timer values to be applied to the BGP sessions. Following this message, a BGP session is automatically established between the network devices T25 and T35.

The new extension of the network R then becomes operational (i.e. the new nodes of this network T25 and T35 have the necessary routing information and are visible by the other nodes of higher level).

It is noted that the procedure for automatically configuring the network R can be initialized from any device of the network R, and in particular from any hierarchical level. If a device of the network receives several proposals of configuration elements from several neighbors due to the gradual propagation, it must choose a proposal among those it has received and inform its neighbors. Several selection criteria can be used, such as the order in which the proposals are received or a selection of these proposals, depending on the source IP address of the neighbors having emitted a proposal.

The invention has been described here in the context of a network of a data center. Although having a preferred application in this context, the invention can be applied to any type of network using a dynamic routing protocol.

The invention claimed is:

1. A configuration method for implementation in a network comprising a plurality of devices and using a dynamic routing protocol, the configuration method comprising:
  receiving, by a first device of the network, a first control message comprising configuration elements required for activation of the dynamic routing protocol in the network to make its use, in the network, operational;
  configuring, by the first device, session establishment parameters according to said dynamic routing protocol used by the first device based on configuration elements comprised in the first message;
  if the configuration elements comprised in the first message comprise at least one session management instruction according to said dynamic routing protocol, executing, by the first device, said at least one management instruction; and
  if the configuration elements comprised in the first message comprise a setpoint for the propagation of the configuration elements in the network, the setpoint defining the devices of the network to which the first device must propagate the configuration elements, sending, by the first device in accordance with said setpoint, at least one second control message to at least one second device of the network, said second control message comprising all or part of the configuration elements comprised in the first message,
wherein the configuration elements comprised in the received first control message and required for activation of the dynamic routing protocol in the network to make its use in the network operational comprise an autonomous system number, an IP Telephony Administrative Domain (ITAD) identifier, or an area number used by Open Shortest Path First (OSPF) routers to be used by the first device, and/or at least one predefined range of values for the selection of autonomous system numbers, ITAD identifiers, or area numbers used by OSPF routers that can be used by devices of the network.

2. The configuration method according to claim 1, wherein executing further comprises establishing at least one session according to said routing protocol with said at least one second device.

3. The configuration method according to claim 2, wherein said at least one second message is a session establishment message according to said routing protocol.

4. The configuration method according to claim 1, wherein said at least one session management instruction comprises at least one setpoint among:
  a setpoint to establish a session according to said routing protocol with all the devices of the network in direct relation;
  a setpoint to establish a session according to said routing protocol with all the devices of the network in direct relation via a predetermined interface;
  a setpoint intended to be applied by at least one device of the network to establish a session according to said routing protocol with all the devices of the network in direct relation and which belong to the same hierarchical level in the network; and
  a setpoint to establish a session according to said routing protocol with at least one device whose routing identifier is included in said setpoint.

5. The configuration method according to claim 1 wherein the configuration elements comprised in the first message further comprise at least one among:
  a cluster size for at least one hierarchical level of the network;
  a type of routes to be advertised by means of the routing protocol;
  a list of route reflector locators used when appropriate in the network;
  a BGP confederation identifier of autonomous systems; and
  at least one timer value to be applied during sessions according to said routing protocol.

6. The configuration method according to claim 1, comprising detecting that one said second device is already configured for the activation of the routing protocol, said detecting leading to a cancellation of the sending of the second message to this second device.

7. The configuration method according to claim 1, comprising detecting that one said second device is already configured for the activation of the routing protocol, said detecting leading to maintaining the sending of the second message to this second device, the second message containing only information likely to be used by the neighbors of the second device.

8. The configuration method according to claim 1, wherein said routing protocol is the BGP protocol (Border Gateway Protocol).

9. A non-transitory computer-readable recording medium on which a computer program is recorded comprising instructions for execution of a configuration method when the instructions are executed by a first device of a network comprising a plurality of devices and using a dynamic routing protocol, the instructions configure the first device to:
  receive, by the first device of the network, a first control message comprising configuration elements required for activation of the dynamic routing protocol in the network to make its use, in the network, operational;
  configure, by the first device, session establishment parameters according to said dynamic routing protocol used by the first device based on configuration elements comprised in the first message;
  if the configuration elements comprised in the first message comprise at least one session management instruction according to said dynamic routing protocol, execute, by the first device, said at least one management instruction; and
  if the configuration elements comprised in the first message comprise a setpoint for the propagation of the configuration elements in the network, the setpoint defining the devices of the network to which the first device must propagate the configuration elements, send, by the first device in accordance with said setpoint, at least one second control message to at least one second device of the network, said second control message comprising all or part of the configuration elements comprised in the first message
  wherein the configuration elements comprised in the received first control message and required for activation of the dynamic routing protocol in the network to make its use in the network operational comprise an autonomous system number, an IP Telephony Administrative Domain (ITAD) identifier, or an area number used by Open Shortest Path First (OSPF) routers to be used by the first device, and/or at least one predefined range of values for the selection of autonomous system numbers, ITAD identifiers, or area numbers used by OSPF routers that can be used by devices of the network.

10. A device of a network comprising a plurality of devices and using a dynamic routing protocol, said device, comprising:
  a processor; and
  a non-transitory computer-readable medium comprising instructions stored thereon, which when executed by the processor configure the device to:
  receive a first control message comprising configuration elements required for the activation of the dynamic routing protocol in the network to make its use, in the network, operational;
  configure session establishment parameters according to said dynamic routing protocol used by the first device based on configuration elements comprised in the first message;
  if the configuration elements comprised in the first message comprise at least one session management instruction according to said dynamic routing protocol, execute said at least one management instruction; and
  if the configuration elements comprised in the first message comprise a setpoint for the propagation of the configuration elements in the network, the setpoint defining the devices of the network to which the first device must propagate the configuration elements, send at least one second control message to at least one second device of the network in accordance with said setpoint, said second control message comprising all or part of the configuration elements comprised in the first message, wherein the configuration elements comprised in the received first control message and required for activation of the dynamic routing protocol in the network to make its use in the network operational comprise an autonomous system number, an IP Telephony Administrative Domain (ITAD) identifier, or an area number used by Open Shortest Path First (OSPF) routers to be used by the first device, and/or at least one predefined range of values for the selection of autonomous system numbers, ITAD identifiers, or area numbers used by OSPF routers that can be used by devices of the network.

11. A communication system of a network using a dynamic routing protocol, said system comprising a plurality of devices according to claim 10, able to gradually propagate configuration elements related to the activation of the routing protocol in the network.

12. The communication system according to claim 11, further including a controller comprising:
- a generation module, configured to generate a control message comprising configuration elements for the activation of the dynamic routing protocol in the network; and
- a sending module, configured to send said control message to a single device of the network according to claim 10.

13. The communication system according to claim 11 further including at least one additional device configured to refuse to apply said second control message received from said device of the network.

* * * * *